March 23, 1926.  
L. SIEBER  
1,577,989
ADJUSTABLE ELEVATING PLATFORM TRUCK
Filed Dec. 5, 1923
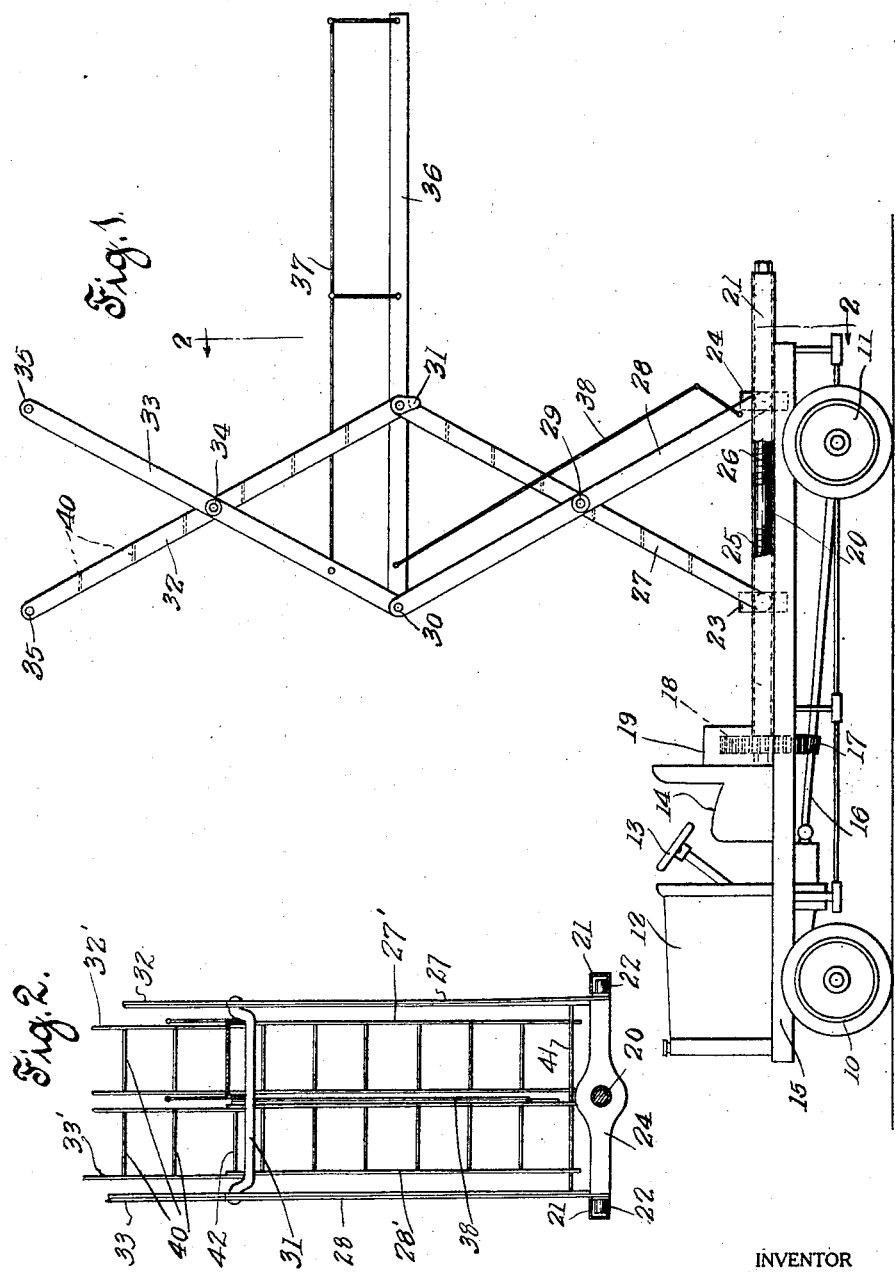
INVENTOR  
Louis Sieber  
BY  
ATTORNEY Patented Mar. 23, 1926.

1,577,989

UNITED STATES PATENT OFFICE.

LOUIS SIEBER, OF NEW YORK, N. Y.

ADJUSTABLE ELEVATING-PLATFORM TRUCK.

Application filed December 5, 1923. Serial No. 678,593.

*To all whom it may concern:*

Be it known that I, LOUIS SIEBER, a citizen of Austria, residing at New York, in the county of Bronx and State of New York, have invented certain new and useful Improvements in Adjustable Elevating-Platform Trucks, of which the following is a specification.

This invention relates to improvements in elevating platform trucks, such as are used in connection with fire apparatus, trolley wire installation and repairing and other uses where a portable, truck supported platform, capable of being adjusted in height, is required.

One of the objects of the invention is to provide a self propelled dirigible truck of the automobile order, having a platform which may be raised to a considerable height above the frame of the truck or lowered to rest upon the frame as may be required.

Another purpose is to produce mechanical means, positively operated by power derived from the motor of the vehicle, for quickly accomplishing the platform adjustment.

A further aim is in the provision of means for ascending to the platform when raised or descending therefrom by ladder elements having hand rails, similar rails being provided at the confines of the platform.

These several objects, together with others which will be apparent as the description progresses, are attained by the novel construction, combination and arrangement of parts hereinafter described and shown in the accompanying drawing, forming a part of this disclosure, and in which:—

Figure 1 is a side elevational view of an embodiment of the invention, showing the platform in a raised position, parts being broken away to show the interior.

Figure 2 is a partial transverse sectional view taken on line 2—2 of Figure 1.

Referring to the drawing in detail, the numerals 10 and 11 designate the front and rear wheels respectively of the vehicle, over the former of which is the motor 12, steering wheel 13 and seat 14.

The side elements of the chassis or frame consist of a pair of opposed frame members 15 and are of considerable length.

Centrally below the frame is a shaft 16 arranged to be driven by the motor 12, and having fixed on it a spur pinion 17 meshing with a gear 18 fixed on one end of a shaft 20 mounted lengthwise of the truck, the gear being partially enclosed in a casing 19 rearward of the seat 14.

A pair of channel members 21 are secured to the frame elements 15 extending from the seat outwardly beyond the rear end of the frame, and operable in these channel members are rollers 22 mounted on the ends of a pair of bars 23 and 24.

Said bars are enlarged at their centers which are screwthreaded to receive the corresponding screw threads 25 and 26 on the shaft 20, one of these screw-threads being cut at an opposite helix to the other, forming right and left hand threads respectively.

Also pivotally engaged on the ends of the bars 23 and 24, between the rolls and shoulders, are pairs of bars 27 and 28, their crossed ends being pivoted by rods 30 and 31 to similar bars 32 and 33 in turn pivoted at 34 and having rods 35 extend across from one pair to the other at their extremities.

The rod 30 also extends from side to side, connecting the adjacent ends, but the rod 31 is bent to extend outside of the bars 27 acting as a stop limiting their outer movement, the ends of the rods serving as pivots.

The platform 36 is drilled to receive the rod 30 and slidably rests upon the bent rod 31, and is provided with hand rails 37, which, due to their connections with the bars 33, are caused to collapse or fold as the platform is lowered.

Similar hand rails 38, over the bars 28, are conveniently accessible when using the steps 39, arranged between two pairs of strips 27' and 28' attached at their lower ends to a rod 41 extending between the bars 27 and 28, leading from the frame to the platform 36, other like steps 40 being disposed in a similar manner between like strips 32' and 33', connected to the upper ends of the strips 27' and 28' by rungs 42 and at their upper ends to the rods 35, these several pairs of strips being spaced adjacent the lazytong elements as shown.

In operation, the truck having been placed in position, the power of the motor is conveyed through the shaft 16, driving the gears and shaft 20 in order to move the bars 23 and 24 towards or from each other, thus changing the angle of the lazy tong bars 27 and 28, which obviously raise or lower the platform in a positive manner.

It is clear that the platform can be readily reached by the steps 39 and the steps 40 may be utilized for the purpose of observation and the like.

Having thus described my invention and set forth the manner of its construction and use what I claim as new and desire to secure by Letters Patent, is:—

The combination with a motor driven truck having an inclined shaft leading from the motor to the rear axle drive, a platform on said truck, a second platform and lazy-tong elements connecting between said platforms, of a screw mounted longitudinally in the first named platform, means on said screw for actuating said lazy tong elements, a gear to drive said screw, and a pinion meshing with said gear, said pinion being fixed on said inclined shaft.

In witness whereof I have affixed my signature.

LOUIS SIEBER.